US009811531B2

(12) United States Patent
Karamanolis et al.

(10) Patent No.: US 9,811,531 B2
(45) Date of Patent: Nov. 7, 2017

(54) SCALABLE DISTRIBUTED STORAGE ARCHITECTURE

(71) Applicant: VMware, Inc., Palo Alto, CA (US)

(72) Inventors: Christos Karamanolis, Los Gatos, CA (US); Soam Vasani, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 14/010,293

(22) Filed: Aug. 26, 2013

(65) Prior Publication Data

US 2015/0058384 A1 Feb. 26, 2015

(51) Int. Cl.
G06F 17/30 (2006.01)

(52) U.S. Cl.
CPC .. *G06F 17/30194* (2013.01); *G06F 17/30233* (2013.01); *G06F 17/30283* (2013.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 6,314,526 B1 | 11/2001 | Arendt et al. |
| 6,553,389 B1 | 4/2003 | Golding et al. |
| 6,658,473 B1 | 12/2003 | Block et al. |
| 6,839,752 B1 | 1/2005 | Miller et al. |
| 7,360,030 B1 | 4/2008 | Georgiev |
| 7,669,029 B1 | 2/2010 | Mishra et al. |
| 7,716,425 B1 | 5/2010 | Uysal et al. |
| 8,074,003 B1 | 12/2011 | Salamon et al. |
| 8,103,769 B1 | 1/2012 | Weiser et al. |
| 8,127,059 B1 | 2/2012 | Carr et al. |
| 8,453,036 B1 | 5/2013 | Goel et al. |
| 8,566,520 B1 | 10/2013 | Bitner et al. |
| 8,635,422 B1 | 1/2014 | Kaliannan et al. |
| 8,645,654 B1 | 2/2014 | Bailey et al. |

(Continued)

FOREIGN PATENT DOCUMENTS

| | | | |
|---|---|---|---|
| JP | 2002108567 A | 4/2002 |
| JP | 2006-107501 A | 4/2006 |

(Continued)

OTHER PUBLICATIONS

International Search Report and Written Opinion dated Oct. 17, 2014, International Application No. PCT/US2014/041761, 10 pages.

(Continued)

*Primary Examiner* — Sana Al Hashemi

(57) ABSTRACT

Techniques are disclosed for providing a file system interface for an object store intended to support simultaneous access to objects stored in the object store by multiple clients. In accordance with one method, an abstraction of a root directory to a hierarchical namespace for the object store is exposed to clients. The object store is backed by a plurality of physical storage devices housed in or directly attached to the plurality of host computers and internally tracks its stored objects using a flat namespace that maps unique identifiers to the stored objects. The creation of top-level objects appearing as subdirectories of the root directory is enabled, wherein each top-level object represents a separate abstraction of a storage device having a separate namespace that can be organized in accordance with any designated file system.

32 Claims, 5 Drawing Sheets

(56) References Cited

U.S. PATENT DOCUMENTS

| | | | |
|---|---|---|---|
| 8,682,916 B2* | 3/2014 | Wong | H04L 67/06 707/758 |
| 8,843,925 B1 | 9/2014 | Beda, III et al. | |
| 8,954,979 B1 | 2/2015 | Myers et al. | |
| 8,984,243 B1 | 3/2015 | Chen et al. | |
| 9,015,123 B1* | 4/2015 | Mathew | G06F 17/30174 707/646 |
| 9,020,912 B1 | 4/2015 | Majee et al. | |
| 9,298,715 B2* | 3/2016 | Kumarasamy | G06F 17/30088 |
| 2001/0034733 A1 | 10/2001 | Prompt et al. | |
| 2002/0188590 A1 | 12/2002 | Curran et al. | |
| 2003/0131020 A1 | 7/2003 | Karamanolis et al. | |
| 2003/0158836 A1 | 8/2003 | Venkatesh et al. | |
| 2003/0204509 A1 | 10/2003 | Dinker et al. | |
| 2004/0054648 A1 | 3/2004 | Mogi et al. | |
| 2004/0177228 A1 | 9/2004 | Leonhardt et al. | |
| 2004/0215639 A1 | 10/2004 | Bamford et al. | |
| 2005/0097073 A1 | 5/2005 | Mair et al. | |
| 2005/0166011 A1 | 7/2005 | Burnett et al. | |
| 2005/0240714 A1 | 10/2005 | McCauley et al. | |
| 2006/0218360 A1 | 9/2006 | Burkey | |
| 2007/0055703 A1* | 3/2007 | Zimran | G06F 17/30123 |
| 2009/0172666 A1 | 7/2009 | Yahalom et al. | |
| 2009/0271412 A1 | 10/2009 | Lacapra et al. | |
| 2009/0276566 A1 | 11/2009 | Coatney et al. | |
| 2010/0299495 A1 | 11/2010 | Frank | |
| 2010/0306280 A1 | 12/2010 | Sapek | |
| 2011/0087631 A1 | 4/2011 | Feldman et al. | |
| 2011/0238814 A1 | 9/2011 | Pitts | |
| 2011/0238857 A1 | 9/2011 | Certain et al. | |
| 2012/0005435 A1 | 1/2012 | Emaru et al. | |
| 2012/0137066 A1 | 5/2012 | Nolterieke et al. | |
| 2012/0239896 A1 | 9/2012 | Sobel | |
| 2012/0303322 A1 | 11/2012 | Rego et al. | |
| 2013/0185413 A1 | 7/2013 | Beaty et al. | |
| 2013/0204849 A1 | 8/2013 | Chacko | |
| 2013/0311989 A1 | 11/2013 | Ota et al. | |
| 2014/0115579 A1 | 4/2014 | Kong | |
| 2014/0130055 A1 | 5/2014 | Guha | |
| 2014/0156925 A1 | 6/2014 | Baron et al. | |
| 2014/0173226 A1 | 6/2014 | Gold | |
| 2014/0201152 A1* | 7/2014 | Kumarasamy | G06F 11/1469 707/647 |
| 2014/0201736 A1 | 7/2014 | Mizrahi et al. | |

FOREIGN PATENT DOCUMENTS

| | | |
|---|---|---|
| JP | 2008527555 A | 7/2008 |
| JP | 2009217475 A | 9/2009 |
| JP | 2010-044789 A | 2/2010 |
| JP | 2010055369 A | 3/2010 |
| JP | 2010-186223 A | 8/2010 |
| WO | 2008109321 A1 | 9/2008 |
| WO | 2010048048 A2 | 4/2010 |
| WO | 2011108027 A1 | 9/2011 |
| WO | 2012090247 A1 | 7/2012 |
| WO | 2012104912 A1 | 8/2012 |

OTHER PUBLICATIONS

International Search Report and Written Opinion dated Sep. 5, 2014, International Application No. PCT/US2014/041757, 8 pages.
International Search Report and Written Opinion dated Sep. 1, 2014, International Application No. PCT/US2014/041764, 11 pages.
International Search Report and Written Opinion dated Oct. 1, 2014, International Application No. PCT/US2014/041164, 9 pages.
International Search Report and Written Opinion dated Dec. 8, 2014, International Application No. PCT/US2014/041172, 15pages.
Adam et al., "Regeneration with Virtual Copies for Replicated Databases,"[Proceedings of the International Conference on Distributed Computing Systems], Los Alamitos, IEEE Comp. Soc. Press, US. vol. CONF. 11, May 20, 1991, p. 429-436.
Hu et al., "Performance Evaluation of Dynamic Supporting Algorithms," Proceedings of the Annual International Computer Software and Applications Conference (COMPSAC), Los Alamitos, IEEE Comp., vol. CONF. 16, Sep. 21, 1992, pp. 90-95.
"Virtual Drive", Web Page <http://searchservervirtualization.techtarget.com/definition/virtual-drive>, Jun. 14, 2012, retrived from Internet Archive Wayback Machine <https://web.archive.org/web/20120614001609/http://searchservervirtualization.techtarget.com/definition/virtual-drive> on Feb. 3, 2016.
Jacek Migdal. 2011. Data Block Encoding of KeyValues (aka delta encoding I prefix compression). The Apache Software Foundation HBase. https://issues.apache.org/jira/browse/HBASE-4218.
Jonathan Gray. 2009. Concurrent LRU Block Cache. The Apache Software Foundation HBase. https://issues.apache.org/jira/browse/HBASE-1460.
Bishwaranjan Bhattacharjee, Lipyeow Lim, Timothy Malkemus, George Mihaila, Kenneth Ross, Sherman Lau, Cathy McArthur, Zoltan Toth, and Reza Sherkat. 2009. Efficient index compression in DB2 LUW. Proc. VLDB Endow. 2, 2 (Aug. 2009), 1462-1473. DOI=10.14778/1687553.1687573 http://dx.doi.org/1 0.14 778/1687553.1687573.
Direct Attached Storage. Article [online]. Apex Microsystems, 2009 [retrieved on May 4, 2016]. Retrieved from the Internet <http://www.apexmicrosystem.com/?page_id+518>.
Final Office Action dated Oct. 31, 2016 in related U.S. Appl. No. 14/209,426.
Austrailian Search Report dated Jan. 16, 2017 in related Australian Patent Application 2014311869.
Japanese Office Action dated Feb. 21, 2017 in related Japanese Patent Application 2016-529769, 7 pages.
Japanese Office Action dated Jan. 10, 2017 in related Japanese Patent Application 2016-531609, 7 pages.
Japanese Office Action dated Mar. 14, 2017 in related Japanese Patent Application 2016-529768, 12 pages.
Vocabulary.com Article [online]. Vocabulary.com, Sep. 10, 2012 [retrieved on Aug. 30, 2016]. Retrieved from the Internet (https://web.archive.org/web/20120910033525/http://www.vocabulary.com/dictionary/incorporated>.
European Search Report dated Jul. 25, 2017 in European Patent Application 14736203.2-1871.
Japanese Office Action dated Jun. 27, 2017 in related Japanese Patent Application 2016-529768, 7 pages.
Final Office Action dated Jul. 12, 2017 in related U.S. Appl. No. 14/010,316.

* cited by examiner

SCALABLE DISTRIBUTED STORAGE ARCHITECTURE

CROSS-REFERENCE TO RELATED APPLICATIONS

This application is related to the following commonly assigned, co-pending applications: "Distributed Policy-Based Provisioning and Enforcement for Quality of Service" (Ser. No. 14/010,247), "Load Balancing of Resources" (Ser. No. 14/010,293), and "Virtual Disk Blueprint for a Virtualized Storage Area Network" (Ser. No. 14/010,316), each of which was filed on Aug. 26, 2013. Each related application is incorporated by reference herein in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second or IOPS capabilities, etc.), usage of such shared local disks to store virtual disks or portions thereof may be distributed among the virtual machines based on the needs of each given virtual machine.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one challenge that arises relates to developing a mechanism to efficiently track where objects are stored across the commodity disks in the cluster as well as how to efficiently access them when needed. For example, while utilizing a flat namespace may provide a simplistic and efficient means to store and retrieve objects, it does not provide enough flexibility to create hierarchical relationships between objects that may be useful in organizing objects in a manner that is compatible with the existing interfaces of clients or that otherwise satisfies the different storage requirements of different clients. For example, many pre-existing environments that could leverage such a scalable object store (e.g., applications, storage management tools, virtualization hypervisors, etc.) may require that the object store provide a certain hierarchical file system based storage interface. One example is vSphere Hypervisor from VMware, Inc. which stores virtual machine metadata in the form of files in a hierarchical file system. Furthermore, because the datastore is shared among the cluster of host computers which may simultaneously access the same data stored therein, any file system that is used to manage the single namespace provided by the datastore needs to have mechanisms for concurrency control. Current distributed or clustered file systems typically provide some form of concurrency control. However, due to limitations in their inherent design, such current file systems typically have limitations on the number of simultaneous "clients" (e.g., host computers or virtual machines that access the file system) they can support. If a current file system used to manage the datastore has limits on the number of clients that can simultaneously access it, then the utility of a highly scalable datastore can plateau, even if additional commodity storage can be easily added to the datastore to increase its capacity, since no additional clients can be added to access such additional storage.

SUMMARY

One embodiment of the present disclosure relates to a method for providing a file system interface for an object store intended to support simultaneous access to objects stored in the object store by multiple clients. In accordance with the method, an abstraction of a root directory to a hierarchical namespace for the object store is exposed to clients. The object store is backed by a plurality of physical storage devices housed in or directly attached to the plurality of host computers and internally tracks its stored objects using a flat namespace that maps unique identifiers to the stored objects. The creation of top-level objects appearing as subdirectories of the root directory is enabled, wherein each top-level object represents a separate abstraction of a storage device having a separate namespace that can be organized in accordance with any designated file system.

By layering a hierarchical namespace that can be used by clients while using a flat namespace to internally store and access objects, techniques herein are able to offer a framework that supports a large scalable clustered file system using a distribute of commodity storage resources. For example, providing the capability to create top-level objects representing file systems that contain file objects that may ultimately be accessed by clients, the foregoing object store offers higher scalability than existing distributed or clustered file systems because it is not confined, for example, by any limitations on the number of simultaneous clients inherent in the design of any particular distributed clustered file system (e.g., VMware VMFS, NFS, etc.) configured for any particular file system object in the object store. That is, implementing a clustered file system on top of an object store has scalability advantages, because different parts of the clustered file system can be placed on different objects such that scalability requirements from particular clients need to be achieved only by the subset of such clients that access data in a certain sub-space of the namespace which, in turn, resides on a certain object.

Other embodiments include, without limitation, a computer-readable medium that includes instructions that enable a processing unit to implement one or more aspects of the disclosed methods as well as a computer system having a processor, memory, and modules configured to implement one or more aspects of the disclosed methods.

DETAILED DESCRIPTION

Figure 1:
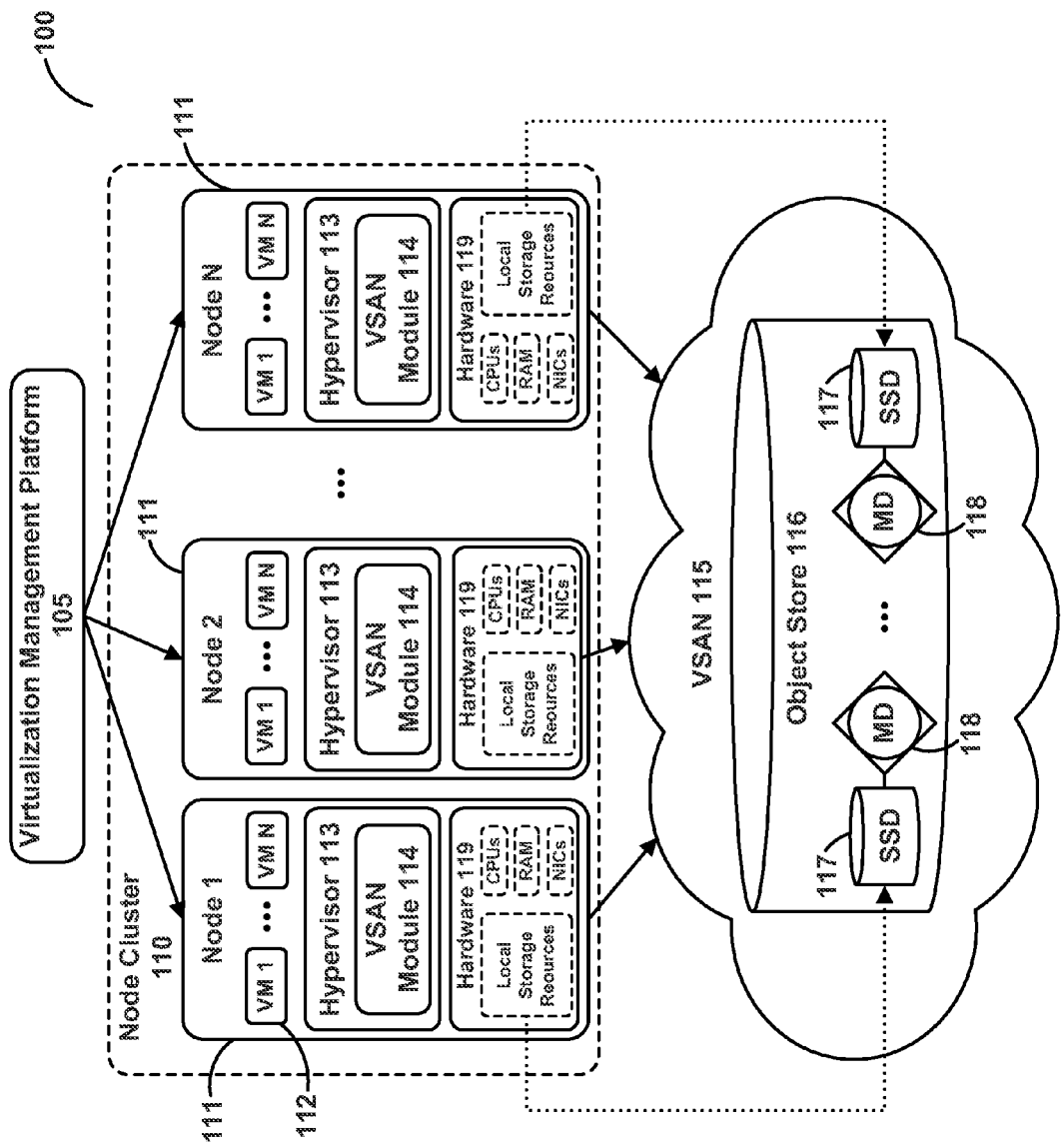
FIG. 1 illustrates an example computing environment, according to one embodiment.

FIG. 1 illustrates a computing environment 100, according to one embodiment. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance. As further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
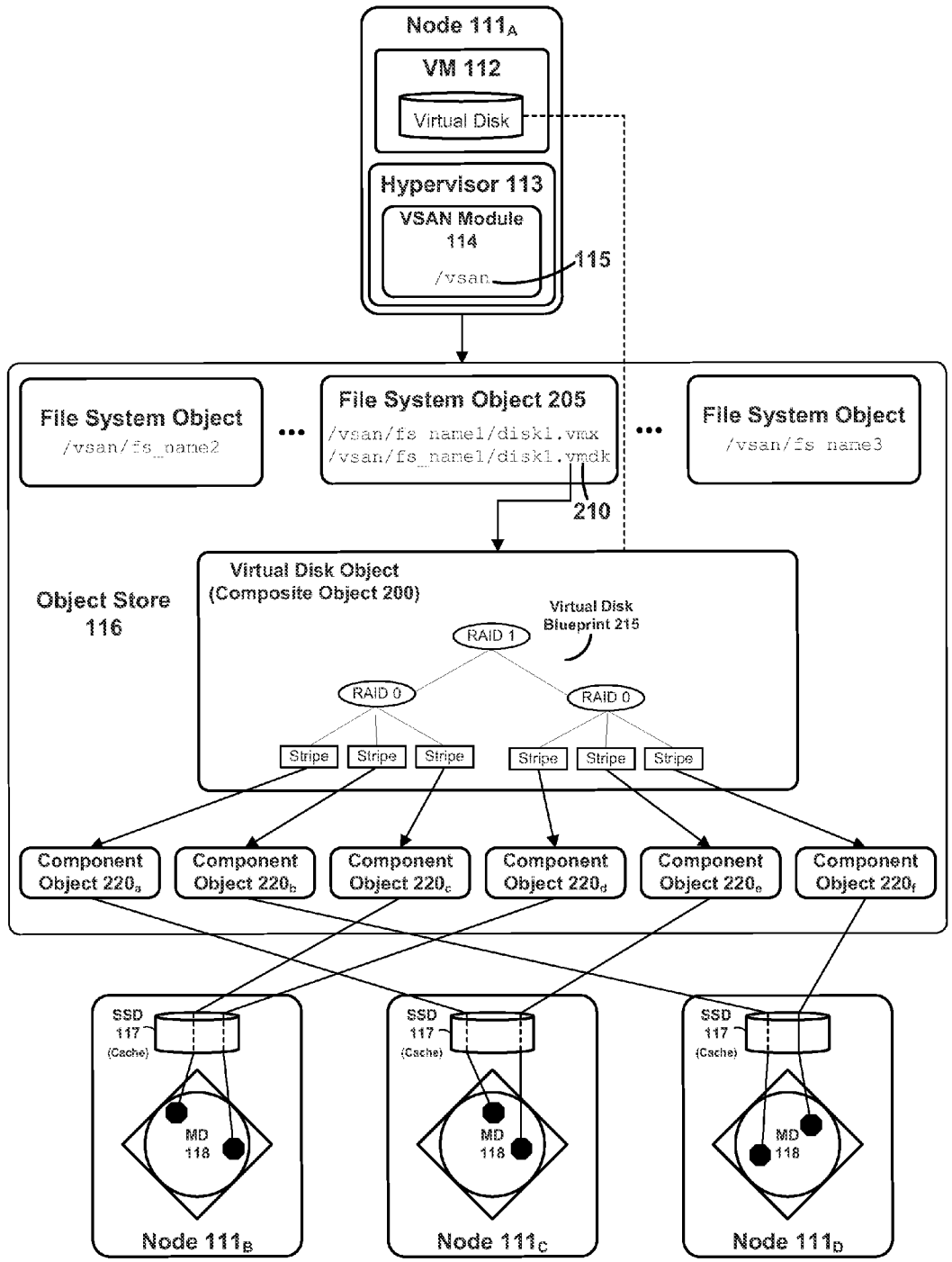
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_k$ in cluster 110 that houses the physical storage resources (e.g., magnetic disks 118, etc.) that actually store the stripe (as well as the location of the stripe within such physical resource).

Figure 3:
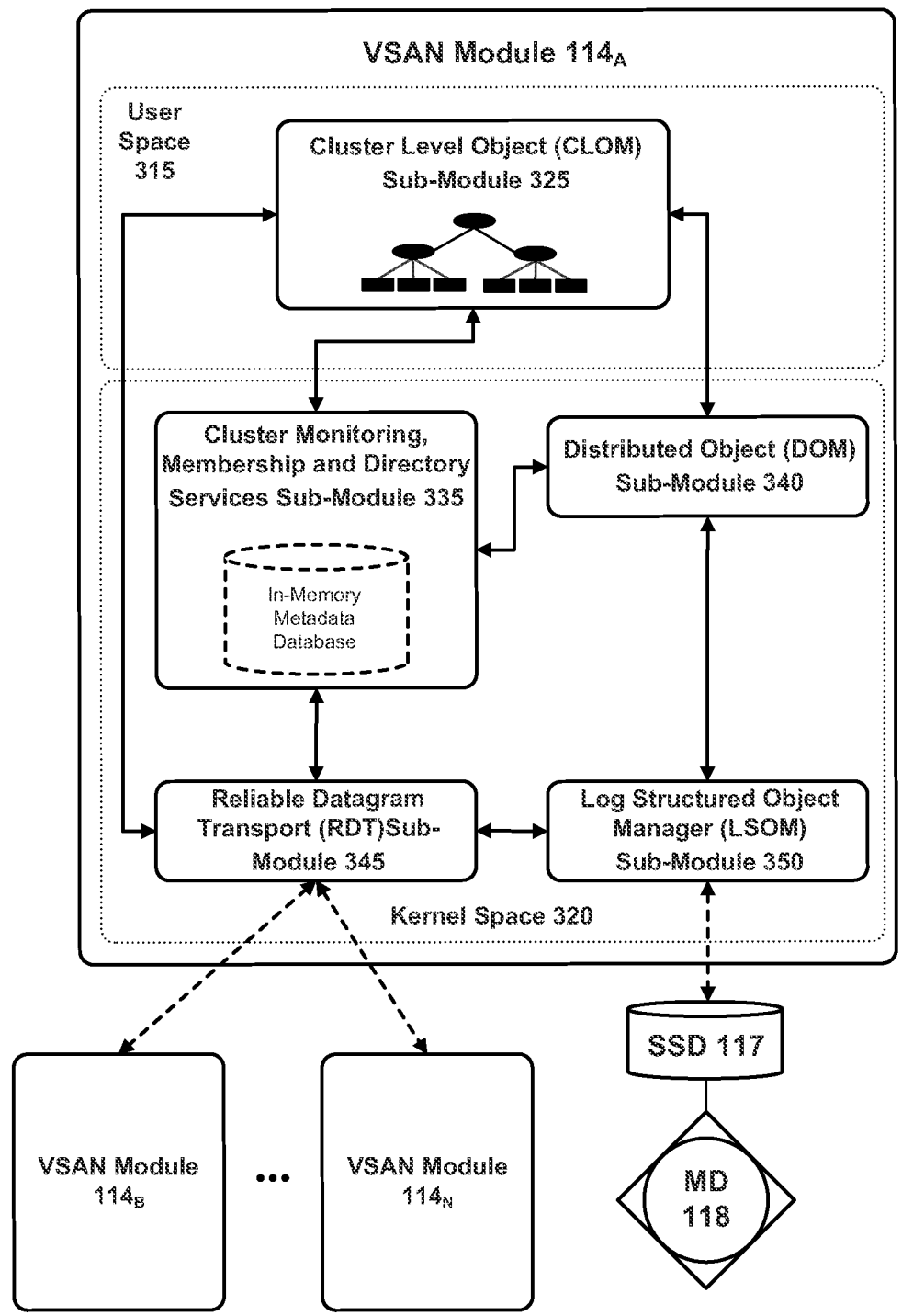
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
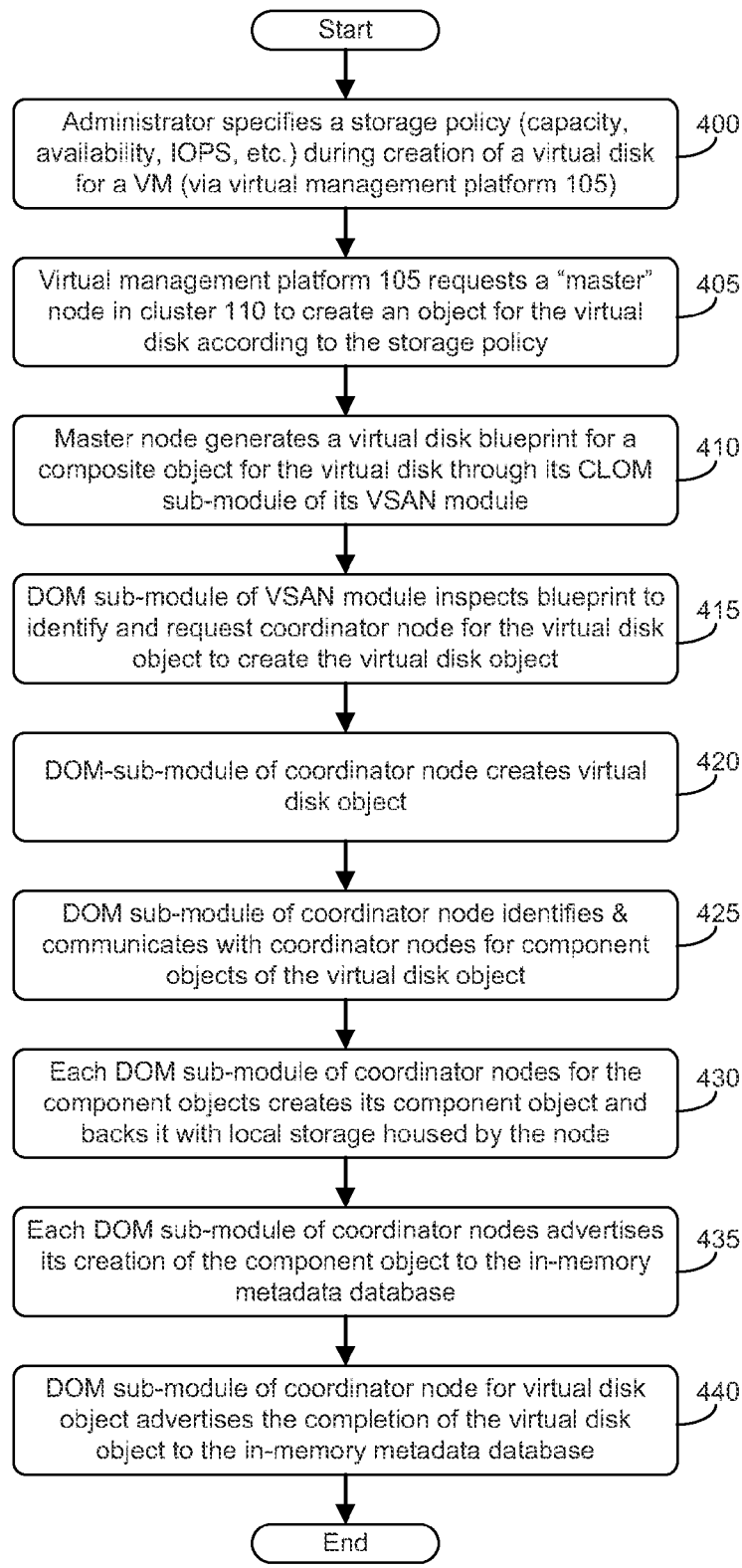
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
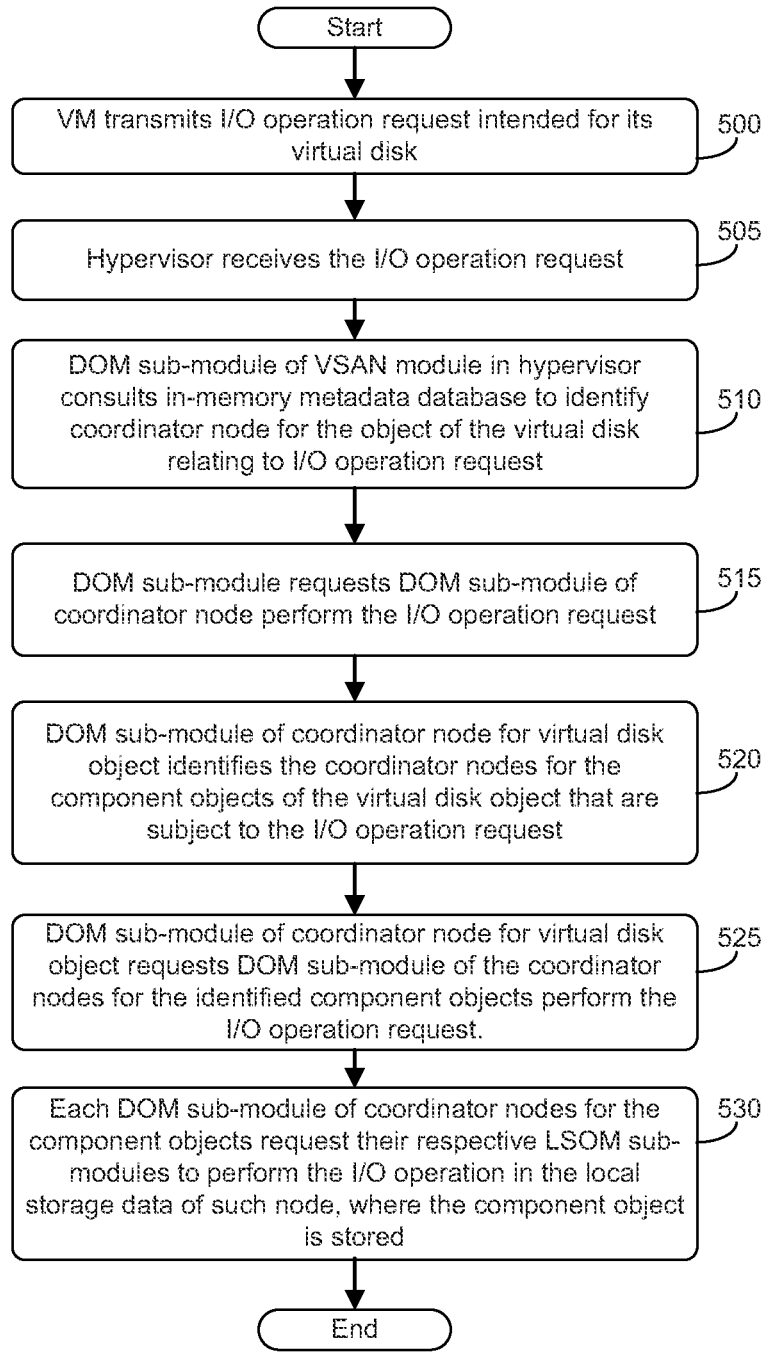
FIG. 5 illustrates the handling of an I/O operation originating from a VM, according to one embodiment.

FIG. 5 illustrates the handling of an I/O operation originating from a VM, according to one embodiment. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiment, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, although a number of foregoing described embodiments describe virtual machines as the clients that access the virtual disks provided by the VSAN module, it should be recognized that any clients, such as a cluster of non-virtualized host servers and/or non-virtualized applications running therein may similarly utilize the VSAN module in alternative embodiment. Similarly, alternative embodiments of the VSAN module may enable creation of high level storage objects other than virtual disks, such as, without limitation, REST objects, files, file systems, blob (binary large objects) and other objects. Similarly, while VSAN module 114 has been generally depicted as embedded in hypervisor 113, alternative embodiments may implement VSAN module separate from hypervisor 113, for example as a special virtual machine or virtual appliance, a separate application or any other "pluggable" module or driver that can be inserted into computing platform in order to provide and manage a distributed object store. Similarly, while the foregoing embodiments have referred to RAID configurations as one technique to organize a blueprint, it should be recognized that other configurations may be utilized in other embodiments, including, without limitation, using erasure codes and other similar techniques. While descriptions herein have discussed using "unique identifiers" to reference objects in the objects, it should be recognized that techniques to generate unique identifiers (hashes, etc.) may not necessarily be guaranteed to generate truly unique identifiers and therefore certain embodiments may further implement techniques for handling name collisions in case there are instances where identifiers for objects are not truly unique. In one such embodiment, in addition to the purported unique identifier, an additional administrator or user specified identifier is also assigned to an object during its creation (or otherwise mapped to the object's unique identifier). When there is a name collision due to a pre-existing object having the same unique identifier as a newly created object, the administrator or user-specified name can be transformed into the newly created object's user identifier.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims

We claim:

1. A method for providing a file system interface for an object store intended to support simultaneous access to objects stored in the object store by multiple clients, the steps comprising:
exposing an abstraction of a root directory to a hierarchical namespace for the object store, wherein the object store (i) is backed by a plurality of physical storage devices housed in or directly attached to different host computers including a first physical storage device housed in or directly attached to a first host computer and a second physical storage device housed in or directly attached to a second host computer; (ii) includes at least one stored object that is backed by both the first physical storage device and the second physical storage device; and (iii) internally tracks its stored objects using a flat namespace that maps unique identifiers to the stored objects; and
enabling creation of top-level objects appearing as sub-directories of the root directory, wherein each top-level object represents a separate abstraction of a storage device having a separate namespace organized in accordance with a designated file system.

2. A non-transitory computer readable storage medium storing instructions, which, when executed on a processor, performs an operation for providing a file system interface for an object store intended to support simultaneous access to objects stored in the object store by multiple clients, the operation comprising:
exposing an abstraction of a storage device, wherein the storage device is backed by an object store comprising, in aggregate, a plurality of physical storage devices housed in or attached to different host computers including a first physical storage device housed in or directly attached to a first host computer and a second physical storage device housed in or directly attached to a second host computer; and
enabling creation of multiple top-level file system objects in the object store that each represent separate file systems, wherein each top-level file system object is configured to (i) respond according to the semantics of its corresponding file system, and (ii) store metadata for file objects representing files stored in the corresponding file system, wherein the file objects are stored in the object store separate from their corresponding top-level file system objects and at least one file object is backed by both the first physical storage device and the second physical storage device.

3. A computer system, comprising:
a processor and
a memory hosting a module, which, when executed on the processor, performs an operation for providing a file system interface for an object store intended to support simultaneous access to objects stored in the object store by multiple clients, the operation comprising:
exposing an abstraction of a storage device, wherein the storage device is backed by an object store comprising, in aggregate, a plurality of physical storage devices housed in or directly attached to different host computers including a first physical storage device housed in or directly attached to a first host computer and a second physical storage device housed in or directly attached to a second host computer; and
enabling creation of multiple top-level file system objects in the object store that each represent separate file systems, wherein each top-level file system object is configured to (i) respond according to the semantics of its corresponding file system, and (ii) store metadata for file objects representing files stored in the corresponding file system, wherein the file objects are stored in the object store separate from their corresponding top-level file system objects and at least one file object is backed by both the first physical storage device and the second physical storage device.

4. The method of claim 1, wherein at least one top-level object is a clustered file system designed to support simultaneous access by clients up to a maximum limit.

5. The method of claim 1, wherein the flat namespace is implemented as an in-memory database, a synchronized copy of which is stored in the memory of each of the host computers.

6. The method of claim 1, wherein an administrator specified name for an object is transformed into a unique identifier for the object when the flat namespace reports a conflict with an auto-generated unique identifier for the object.

7. The method of claim 1, wherein the stored object that is backed by both the first physical storage device and the second physical storage device represents a virtual disk file used by a virtual machine running on one of the host computers.

8. The computer readable storage medium of claim 2, wherein at least one top-level object contains a clustered file system designed to support simultaneous access by clients up to a maximum limit.

9. The computer readable storage medium of claim 2, wherein the flat namespace is implemented as an in-memory database, a synchronized copy of which is stored in the memory of each of the host computers.

10. The method of claim 2, wherein the file object that is backed by both the first physical storage device and the second physical storage device represents a virtual disk file used by a virtual machine running on one of the host computers.

11. The computer system of claim 3, wherein at least one top-level object contains a clustered file system designed to support simultaneous access by clients up to a maximum limit.

12. The computer system of claim 3, wherein the flat namespace is implemented as an in-memory database, a synchronized copy of which is stored in the memory of each of the host computers.

13. The computer system of claim 3, wherein the file object that is backed by both the first physical storage device and the second physical storage device represents a virtual disk file used by a virtual machine running on one of the host computers.

14. The method of claim 4, wherein the top-level object is auto-mounted as a subdirectory at a client's local version of the abstraction of the root directory when the client attempts to access a file stored within the clustered file system.

15. The method of claim 4, wherein the top-level object is configured to store metadata for file objects representing files stored in the clustered file system, wherein the file objects are stored in the object store separate from the top-level object.

16. The computer readable storage medium of claim 8, wherein the top-level object is auto-mounted as a subdirectory at a client's local version of the abstraction of the root directory when the client attempts to access a file stored within the clustered file system.

17. The computer readable storage medium of claim 8, wherein the top-level object is configured to store metadata for file objects representing files stored in the clustered file system, wherein the file objects are stored in the object store separate from the top-level object.

18. The computer system of claim 11, wherein the top-level object is auto-mounted as a subdirectory at a client's local version of the abstraction of the root directory when the client attempts to access a file stored within the clustered file system.

19. The computer system of claim 11, wherein the top-level object is configured to store metadata for file objects representing files stored in the clustered file system, wherein the file objects are stored in the object store separate from the top-level object.

20. The method of claim 14, wherein the top-level objects is automatically unmounted after a period of time in which no files stored within the clustered file system are accessed by the client.

21. The method of claim 15, wherein a file object is configured to store unique identifiers usable by the flat namespace to find locations of corresponding component objects that represent separate portions of the files and are stored in the object store separate from the file object.

22. The method of claim 15, wherein the metadata stored in the top-level object for a file object includes at least a file descriptor that comprises a unique identifier usable by the flat namespace to find a location of the file object in the object store.

23. The computer readable storage medium of claim 17, wherein a file object is configured to store unique identifiers usable by the flat namespace to find locations of corresponding component objects that represent separate portions of the files and are stored in the object store separate from the file object.

24. The computer readable storage medium of claim 17, wherein the metadata stored in the top-level object for a file object includes at least a file descriptor that comprises a unique identifier usable by the flat namespace to find a location of the file object in the object store.

25. The computer system of claim 19, wherein a file object is configured to store unique identifiers usable by the flat namespace to find locations of corresponding component objects that represent separate portions of the files and are stored in the object store separate from the file object.

26. The computer system of claim 19, wherein the metadata stored in the top-level object for a file object includes at least a file descriptor that comprises a unique identifier usable by the flat namespace to find a location of the file object in the object store.

27. The method of claim 22, wherein the file represented by the file object is a virtual disk file used by a virtual machine running on one of the host computers.

28. The computer readable storage medium of claim 24, wherein the file represented by the file object is a virtual disk file used by a virtual machine running on one of the host computers.

29. The computer system of claim 26, wherein the file represented by the file object is a virtual disk file used by a virtual machine running on one of the host computers.

30. The method of claim 27, wherein the top-level object is configured to store metadata for file objects that are only utilized by one of a plurality of virtual machines capable of being instantiated on any of the host computers.

31. The computer readable storage medium of claim 28, wherein the top-level object is configured to store metadata for file objects that are only utilized by one of a plurality of virtual machines capable of being instantiated on any of the of host computers.

32. The computer system of claim 29, wherein the top-level object is configured to store metadata for file objects that are only utilized by one of a plurality of virtual machines capable of being instantiated on any of the host computers.

* * * * *